(12) United States Patent
Seiler

(10) Patent No.: US 12,307,233 B2
(45) Date of Patent: May 20, 2025

(54) METHOD FOR PRODUCING A SOFTWARE COMPONENT FOR AN ELECTRONIC COMPUTING DEVICE OF A MOTOR VEHICLE, COMPUTER PROGRAM PRODUCT, COMPUTER-READABLE STORAGE MEDIUM, AS WELL AS A VEHICLE-EXTERNAL UPDATE SYSTEM

(71) Applicant: MERCEDES-BENZ GROUP AG, Stuttgart (DE)

(72) Inventor: Christian Seiler, Fellbach-Schmiden (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 202 days.

(21) Appl. No.: 18/029,739

(22) PCT Filed: Aug. 20, 2021

(86) PCT No.: PCT/EP2021/073104
§ 371 (c)(1),
(2) Date: Mar. 31, 2023

(87) PCT Pub. No.: WO2022/069109
PCT Pub. Date: Apr. 7, 2022

(65) Prior Publication Data
US 2023/0367580 A1    Nov. 16, 2023

(30) Foreign Application Priority Data

Oct. 2, 2020  (DE) ...................... 10 2020 006 031.5

(51) Int. Cl.
*G06F 8/65*  (2018.01)
*H04L 67/00*  (2022.01)

(52) U.S. Cl.
CPC ................ *G06F 8/65* (2013.01); *H04L 67/34* (2013.01)

(58) Field of Classification Search
None
See application file for complete search history.

(56) References Cited

U.S. PATENT DOCUMENTS 10,165,084 B2    12/2018  Moeller et al.
11,269,617 B2     3/2022  Biermann et al.
(Continued)

FOREIGN PATENT DOCUMENTS

DE    102006056021 A1   6/2008
DE    102008036711 A1   2/2010
(Continued)

OTHER PUBLICATIONS

Guissouma et al., "A Generic System for Automotive Software Over the Air (SOTA) Updates Allowing Efficient Variant and Release Management," Springer, 2019, 12pg. (Year: 2019).*
(Continued)

*Primary Examiner* — Ryan D. Coyer
(74) *Attorney, Agent, or Firm* — PATENT PORTFOLIO BUILDERS PLLC

(57) ABSTRACT

A method for producing a software component for an electronic computing device of a motor vehicle by a vehicle-external update system involves producing the software component based on a configuration write sequence, a configuration read sequence, and a configuration rule set by a vehicle-external electronic computing device of the vehicle-external update system. The configuration rule set is produced based on a configuration data set. The configuration data set is produced based on a vehicle equipment option list and a technical combination of features for the motor vehicle.

8 Claims, 1 Drawing Sheet

(56) References Cited

U.S. PATENT DOCUMENTS

| | | | | |
|---|---|---|---|---|
| 2011/0307336 | A1* | 12/2011 | Smirnov | G06Q 30/0265 |
| | | | | 705/14.62 |
| 2018/0018160 | A1* | 1/2018 | Teraoka | G06F 9/445 |
| 2019/0265868 | A1* | 8/2019 | Penilla | H04L 63/0861 |
| 2021/0116256 | A1* | 4/2021 | Konrardy | G06Q 50/265 |
| 2022/0147578 | A1* | 5/2022 | Ricci | G06V 40/166 |

FOREIGN PATENT DOCUMENTS

| | | | | |
|---|---|---|---|---|
| DE | 102016210674 | A1 | 12/2016 | |
| DE | 102018001347 | A1 | 8/2019 | |
| EP | 3422182 | A1 * | 1/2019 | G06F 11/0739 |
| JP | H10293686 | A | 11/1998 | |
| JP | 2002342083 | A | 11/2002 | |
| WO | 2019186820 | A1 | 10/2019 | |

OTHER PUBLICATIONS

Office Action dated Apr. 19, 2024 in related/corresponding JP Application No. 2023-520273.

Office Action dated Nov. 12, 2024 in related/corresponding KR Application No. 2023-7010351.

Guissouma et al.; "A Generic System for Automotive Software Over The Air (SOTA) Updates Allowing Efficient Variant Release Management;" Part I, Genetic and Evolutionary Computing: Proceedings of the Twelfth International Conference on Genetic and Evolutionary Computing, Dec. 14-17, 2019; Changzhou, Jiangsu, China; Jan. 2019; pp. 78-89; Berlin Springer.

International Search Report and Written Opinion mailed Dec. 6, 2021 in related/corresponding International Application No. PCT/EP2021/073104.

Office Action created Sep. 10, 2021 in related/corresponding DE Application No. 10 2020 006 031.5.

* cited by examiner

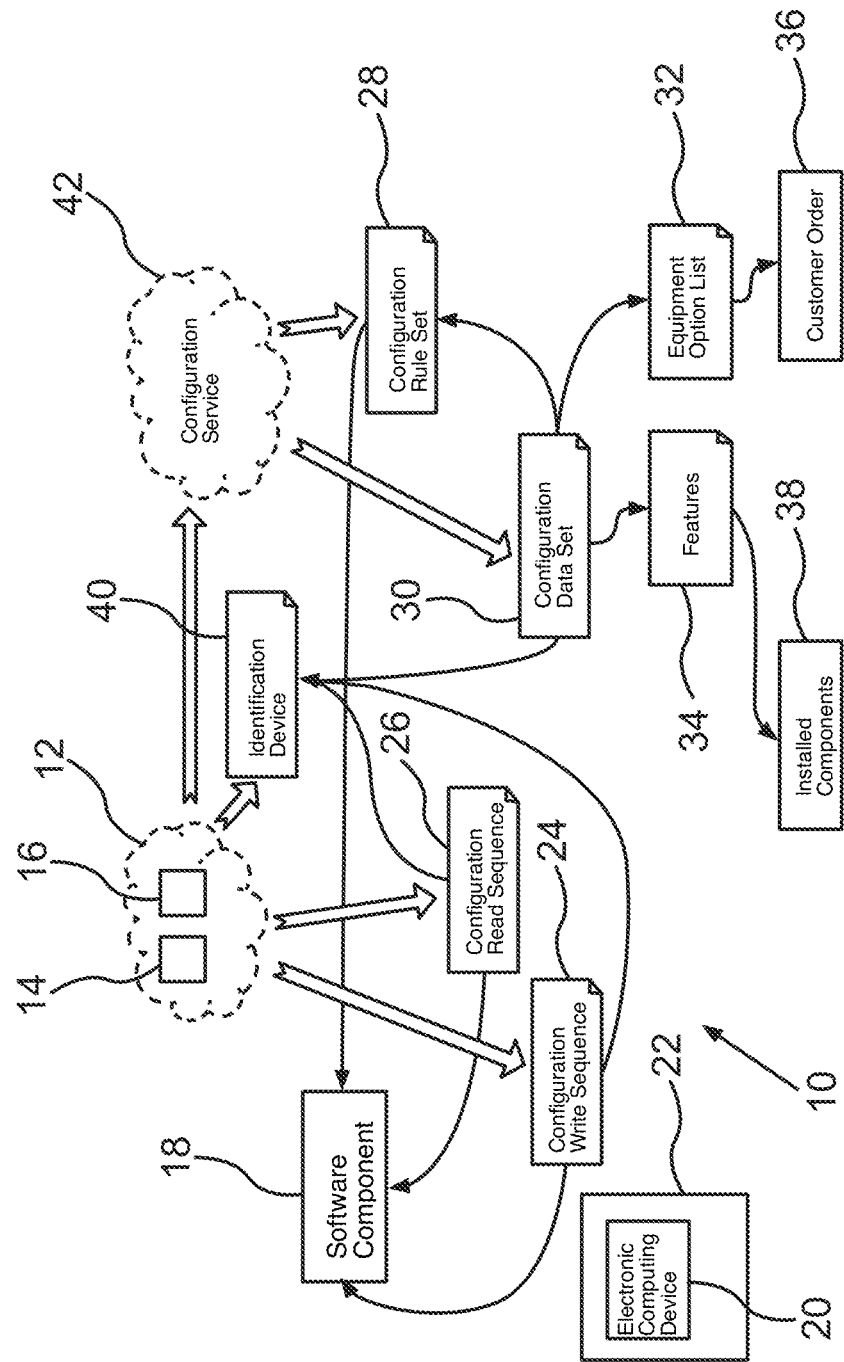

METHOD FOR PRODUCING A SOFTWARE COMPONENT FOR AN ELECTRONIC COMPUTING DEVICE OF A MOTOR VEHICLE, COMPUTER PROGRAM PRODUCT, COMPUTER-READABLE STORAGE MEDIUM, AS WELL AS A VEHICLE-EXTERNAL UPDATE SYSTEM

BACKGROUND AND SUMMARY OF THE INVENTION

Exemplary embodiments of the invention relate to a method for producing a software component for an electronic computing device of a motor vehicle by means of a vehicle-external update system, a computer program product, a computer-readable storage medium, and a vehicle-external update system.

From the prior art it is already known that current remote software update processes include a dual approach for updating a motor vehicle via on-board updating administrative bodies, which other electronic computing devices, which can also be referred to as control devices, can update by means of on-board communication protocols. There is currently no possibility to collect the software configuration data sets from the target control devices during the on-board update mechanism, so that this data cannot be registered by a vehicle-external electronic computing device, which can also be referred to as a back-end server, for remote updating. There is also no mechanism for checking the constraints of input data and thus no solution for recognizing changes to vehicle equipment option lists, a technical combination of features, as well as a configuration rule set.

DE 10 2018 001 347 A1 relates to a system for transmitting at least one update package for at least one control device of a motor vehicle, having a vehicle-external storage device, which is designed for storing the update package, having a communication device, which is designed for wirelessly transmitting the update package from the vehicle-external storage device to at least one transmission device of the system, which controls a transmission process of the update package for the at least one control device and is designed for installing the update package on the at least one control device, wherein the at least one transmission device is arranged inside the vehicle.

Exemplary embodiments of the present invention are directed to a method, a computer program product, a computer-readable storage medium, and a vehicle-external update system, by means of which an improved remote management of software configurations can be realized.

An aspect of the invention relates to a method for producing a software component for an electronic computing device of a motor vehicle by means of a vehicle-external update system, wherein the software component is produced based on a configuration write sequence, a configuration read sequence, and a configuration rule set by means of a vehicle-external electronic computing device of the vehicle-external update system.

The configuration rule set is produced based on a configuration data set, wherein the configuration data set is produced based on a vehicle equipment option list and on a technical combination of features for the motor vehicle.

It is thereby, in particular, made possible that a complete solution for remotely managing software configurations, in particular for producing a software component, for example for a fleet of several motor vehicle due to changes of artifacts, can be realized, on which the software configurations are based.

In the present case, the electronic computing device is an electronic computing device of a motor vehicle. It is self-evident that the method can also be used for other electronic computing device of other entities. The method according to the invention is thus not limited to motor vehicles.

In particular, a concept for separating configuration data from the addressing of the configuration write sequence (CWS) and from the addressing of the configuration read sequence (CRS) is thus expanded to include provided information by adding references to the information sources, from which the configuration data is derived and thus is based on.

The vehicle equipment option list (VEOL) is, in particular, a list which is derived from the customer order. The activated functions are thus represented that are independent of whether the vehicle equipment option list is used on installed or non-installed hardware equipment or on activated or non-activated software.

The technical combination of features is in particular a technical feature set (TFS) of components, to which the software configuration relates.

The configuration rule set (CRUS) can, for example, be based on the software component itself. This rule set builds on the vehicle equipment option list and the technical combination of features and defines the concrete configuration data for each individual software function. This rule set is based on a concrete vehicle entity. The constraints of the vehicle equipment option list, the technical combination of features and of the configuration rule set are documented as metadata inside the configuration data set itself. This enables the recognition of and immediate reaction to changes or even planned changes to the vehicle equipment option list, the technical combination of features and to the configuration rule set.

According to a further advantageous embodiment, the vehicle equipment option list is produced based on a customer order for the configuration, by means of the vehicle-external update system. The vehicle equipment option list is thus a list, which describes what the customer installed during a production of the motor vehicle and which software is connected with this. in particular, the activated functions are represented by this, which are derived from the customer order. These functions are, in particular, not based on whether the vehicle equipment option list is operated on installed or non-installed hardware equipment and/or on activated or non-activated software. An improved production of the software component can thereby be realized.

It is furthermore advantageous if the technical combination of features is produced based on components installed in the motor vehicle by means of the vehicle-external update system. The technical combination of features is thus, in particular, based on so-called hardware components, which are installed in the motor vehicle. These technical features can, in particular, optionally relate to software configurations. An improved production of the software component is thus realized.

It has further proven to be advantageous if the configuration data set is produced for the electronic computing device based on an identification of the electronic computing device by means of an identification device of the vehicle-external update system. This is thus, in particular, an identification, for example of a current version of the electronic computing device or a software of the electronic computing device. A version state of the diagnostic data pool can thus be realized for the software component. An improved production of the software component is thereby realized.

It has further proven to be advantageous if the configuration rule set is produced based on the vehicle equipment option list and based on the technical combination of features. In other words, it is provided that the configuration service, the vehicle equipment option list, as well as the information from the technical combination of features is taken into consideration. Furthermore, the configuration rule set can also be taken into consideration when creating the configuration data set, which itself in turn relates to the configuration write sequence and to the configuration read sequence and, indirectly, to, for example, the identification device, in order to exchange this data with a corresponding target control device in the motor vehicle.

In a further advantageous embodiment, a change in the technical combination of features in the motor vehicle is taken into consideration during the production of the software component. In the case that, for example, a technical feature inside the motor vehicle changes, then the respective state of the technical combination of features is provided with a clear identifier, so that the respective state can be correctly differentiated, to which the configuration rule set relates. In this case, a corresponding change can also lead to a software update with changes of configuration.

According to a further advantageous embodiment, a change in the vehicle equipment option list in the motor vehicle is taken into consideration during the production of the software component. Should the vehicle equipment option list also, for example, change, for example during a life cycle of the motor vehicle or of the identity, then this can be correspondingly taken into consideration. A possible embodiment is the additional installation of, for example, a trailer coupling for the motor vehicle, in a workshop. A software update and a configuration change could therefore be necessary, which is caused by the change of the vehicle equipment option list. In this embodiment, the change to the vehicle equipment option list would directly generate the new configuration data sets of all affected electronic computing devices of the corresponding motor vehicle, which depend on this change. A configuration update is thus subsequently directly predictable.

Alternatively, or additionally, a change in the configuration rule set can also be taken into consideration during the production of the software component. New functions can hereby involve new configuration requirements and thus lead to new entries in the CRUS. With the availability of the current configuration data sets of all software components of all control devices of the whole fleet on the backend, different use cases can be realized.

A further aspect of the invention relates to a computer program product with programming means, which can be stored in a computer-readable storage medium of an electronic computing device, and comprises commands to carry out a method according to the preceding aspect if the computer program product is processed by means of the electronic computing device.

Yet a further aspect of the invention relates to a computer-readable storage medium having a computer program product according to the preceding aspect.

Yet a further aspect of the invention relates to a vehicle-external update system with at least one vehicle-external electronic computing device, wherein the vehicle-external update system is designed to carry out a method according to the preceding aspect. In particular, the method is carried out by means of the vehicle-external update system.

Advantageous embodiments of the method are to be seen as advantageous embodiments of the computer program product, of the computer-readable storage medium, as well as of the vehicle-external update system. The vehicle-external update system has objective features to this end, which enable a method and an advantageous embodiment of it to be carried out.

Further advantages, features and details of the invention arise from the following description of a preferred exemplary embodiment, as well as with the aid of the drawing. The features and feature combinations cited above in the description and below in the description of the FIGURES and/or shown in the single FIGURE alone can be used not only in each specified combination, but rather also in other combinations or individually, without exceeding the scope of the invention.

BRIEF DESCRIPTION OF THE SOLE FIGURE

The sole FIGURE shows a schematic block diagram of an embodiment of a vehicle-external update system.

In the FIGURE, the same or functionally identical elements are provided with the same reference numerals.

DETAILED DESCRIPTION

The sole FIGURE shows an embodiment of a vehicle-external update system 10 in a schematic block diagram. The vehicle-external update system 10 has at least one vehicle-external electronic computing device 12. The vehicle-external electronic computing device 12 can, for example, be formed as a back-end server. In particular, the vehicle-external electronic computing device 12 can be formed as a diagnostic data cloud.

The vehicle-external electronic computing device 12 can, for example, comprise a computer program product 14 having programming means that can be stored in a computer-readable storage medium 16 of the electronic computing device 12, and comprises commands to carry out a method according to the invention if the computer program product is processed by means of the electronic computing device 12. The computer-readable storage medium 16 can in turn have the computer program product 14.

The sole FIGURE, in particular, shows a method for producing a software component 18 for an electronic computing device 20 of a purely schematically shown motor vehicle 22, by means of the vehicle-external update system 10. The software component 18 is produced based on a configuration write sequence 24, a configuration read sequence 26, and a configuration rule set 28 by means of the vehicle-external electronic computing device 12 of the vehicle-external update system 10.

It is thereby provided that the configuration rule set 28 is produced based on a configuration data set 30, wherein the configuration data set 30 is produced based on a vehicle equipment option list 32 and on a technical combination of features 34 for the motor vehicle 22.

It can further be provided that the vehicle equipment option list 32 is produced based on a customer order 36 for the configuration by means of the vehicle-external update system 10. It can furthermore be provided that the technical combination of features 34 is produced based on components 38 installed in the motor vehicle 22 by means of the vehicle-external update system 10.

The sole FIGURE furthermore shows that the configuration data set 30 is produced for the electronic computing device 20 based on an identification of the electronic computing device 20 by means of an identification device 40 of the vehicle-external update system 10.

It can further, in particular, be provided that the configuration rule set 28 is produced based on the vehicle equipment option list 32 and based on the technical combination of features 34. It can further be provided that a change in the technical combination of features 34 in the motor vehicle 22 is taken into consideration in the software component 18. Furthermore, a change in the vehicle equipment option list 32 in the motor vehicle 22 can be taken into consideration during the production of the software component 18.

The sole FIGURE, in particular, shows that the configuration read sequence 26 and the configuration write sequence 24 are derived from the state of the software component 18 and are generated from the vehicle-external electronic computing device 12, in particular from the diagnostic data cloud. These relate to a version state of the diagnostic data pool for the software component 18, which is, in particular, identified by means of the identification device 40. The software component 18 is used in the electronic computing device 20, which are contained in entities that can be updated by means of remote update services. The entities, in particular present in the motor vehicle 22, can be road vehicles, but also buildings, airplanes, drones, ships, robots, machines or similar, or any type of cyber-physical systems that contain programmable electronic control units, so electronic computing devices 20, that are connected with each other. In this exemplary embodiment, the motor vehicle 22 is in particular the reference for the realization of the concept according to the invention.

The configuration rule set 28 relates to the software component 18 and describes the rules under which circumstances which concrete values from the diagnostic data pool should be written into the configuration data set 30. A configuration service 42 uses the vehicle equipment option list 32, the information from the technical combination of features 34, which itself in turn indirectly relates to the configuration read sequence 26 and the configuration write sequence 24 via the identification device 40, in order to exchange this data with the target control device in the motor vehicle 22, so with the electronic computing device 20. The vehicle equipment option list 32 is itself derived from the customer order 36 and contains the codes and the optional extras codes that are relevant for the motor vehicle 22 from a customer and production perspective. The technical combination of features 34 describes technical features of components 38, or hardware components, that are relevant for the software components 18, respectively for the software functions contained in this. As soon as all of these artefacts are provided with cross-references and are subject to version control, the dependencies are generated, and the data sets or the whole system can use these artefacts for the complete life cycle.

The FIGURE is now exemplarily explained, using the example of a starter battery. The software component 18 or software function can, for example, be a battery charge management that has a diagnostic interface, the interface specification of which is stored in the vehicle-external electronic computing device 12 and is relevant for this example in a particular version, which is identified inside the identification device 40. With the configuration rule set 28, the capacity of the starter battery can, for example, be described in ampere hours, wherein this, for example, comprises the values 60, 70 and 95 ampere hours. The structure and the possible values are known to the configuration service 42. The battery present here, which in particular describes a component 38, with the part number 1 has, for example, the technical combination of features 34 with a capacity value of 95 ampere hours. In this example, exactly this type of battery is installed in the present motor vehicle 22. This is documented by a corresponding part number and known in the process. Furthermore, the present motor vehicle 22 was, for example in the customer order 36, ordered for the German market. Additionally, the options "high performance motor" and "exterior paint color blue" are contained in the customer order 36. All three pieces of information are stored as Code A, B and C in the vehicle equipment option list 32.

The configuration service 42 now has the task of evaluating the configuration rule set 28 for the corresponding service. In this logical expression, the possible input parameters are logically combined from the technical combination of features 34 and the vehicle equipment option list 32. In this example the rules could be as follows: "If the technical feature for the present component corresponds to the value of 95 ampere hours, then the value should be set at "95"." This value within the configuration rule set 28 for the parameters is indirectly brought into relation with the configuration read sequence 26 and the configuration write sequence 24 via the reference to the variant of the electronic computing device 20 and is thus transferred to the software component 18.

It can, for example, be the case that, during the life cycle of the software component 18, the corresponding configuration rule set 28 develops. New functions bring new configuration requirements with them and lead to new entries in the configuration rule set 28. With the availability of the current configuration data sets 30 of all software components 18 of all electronic computing devices 20 of the whole fleet on the vehicle-external electronic computing device 12, the following use cases can, for example, be realized.

A first use case would, for example, be a "what-if" analysis. It can hereby be checked how changes to the configuration rule set 28 affect the configuration data 30 of the fleet. It can further be checked how many entities, for example motor vehicles 22, are affected. It can furthermore be checked how many are accessible and must correspondingly be updated.

Furthermore, if changes are made, the exact set of entities that are affected by the changes can be identified, and the campaigns can be designed in such a way that only these entities are updated.

If, as a further case, changes of the configuration rule set 28 have to be reversed, then the previous version of the configuration data sets 30 may still be available, since they are under version control and can be distributed across the entities affected by the reversal.

Should the corresponding vehicle equipment option list 32 change during the life cycle of the motor vehicle 22 or the entity, which can, for example, be realized by means of an additional installation of a trailer coupling, then a software update and configuration change may be necessary. This is triggered by the change of the vehicle equipment option list 32. In this use case, the change of the vehicle equipment option list 32 is directly generated in the new configuration data set 30 of all affected electronic computing devices 20 of the corresponding motor vehicle 22, which are subject to this change. A configuration update is thus subsequently directly predictable.

Should, for example, a change of the technical combination of features for the motor vehicle 22 be necessary, then the respective state of the technical combination of features 34 is provided with a unique identifier, so that the respective state can be correctly identified, which is based on the configuration rule set 28. In this case, such a change can also lead to a software update with a configuration change.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for producing a software component for an electronic computing device of a motor vehicle, the method comprising:
    producing, by a vehicle-external update system, a configuration data set based on a vehicle equipment option list and a technical combination of features for the motor vehicle;
    producing, by the vehicle-external update system, a configuration rule set based on the configuration data set; and
    producing, by a vehicle-external electronic computing device of the vehicle-external update system, the software component based on a configuration write sequence, a configuration read sequence, and the configuration rule set.

2. The method of claim 1, wherein the vehicle-external update system produces the vehicle equipment option list based on a customer order for configuration.

3. The method of claim 1, wherein the vehicle-external update system produces the technical combination of features based on at least one component installed in the motor vehicle.

4. The method of claim 1, wherein the configuration data set for the electronic computing device is produced based on an identification of the electronic computing device by an identification device of the vehicle-external update system.

5. The method of claim 1, wherein the configuration rule set is produced based on the vehicle equipment option list and the technical combination of features.

6. The method of claim 1, wherein a change in the technical combination of features in the motor vehicle is considered during the production of the software component.

7. The method of claim 1, wherein a change in the vehicle equipment option list in the motor vehicle is considered during the production of the software component.

8. A non-transitory computer-readable medium comprising a computer program product, which when executed by a vehicle-external electronic computing device, causes the vehicle-external electronic computing device to:
    produce a configuration data set based on a vehicle equipment option list and a technical combination of features for the motor vehicle;
    produce a configuration rule set based on the configuration data set; and
    produce the software component based on a configuration write sequence, a configuration read sequence, and the configuration rule set.

\* \* \* \* \*